Figure 1:
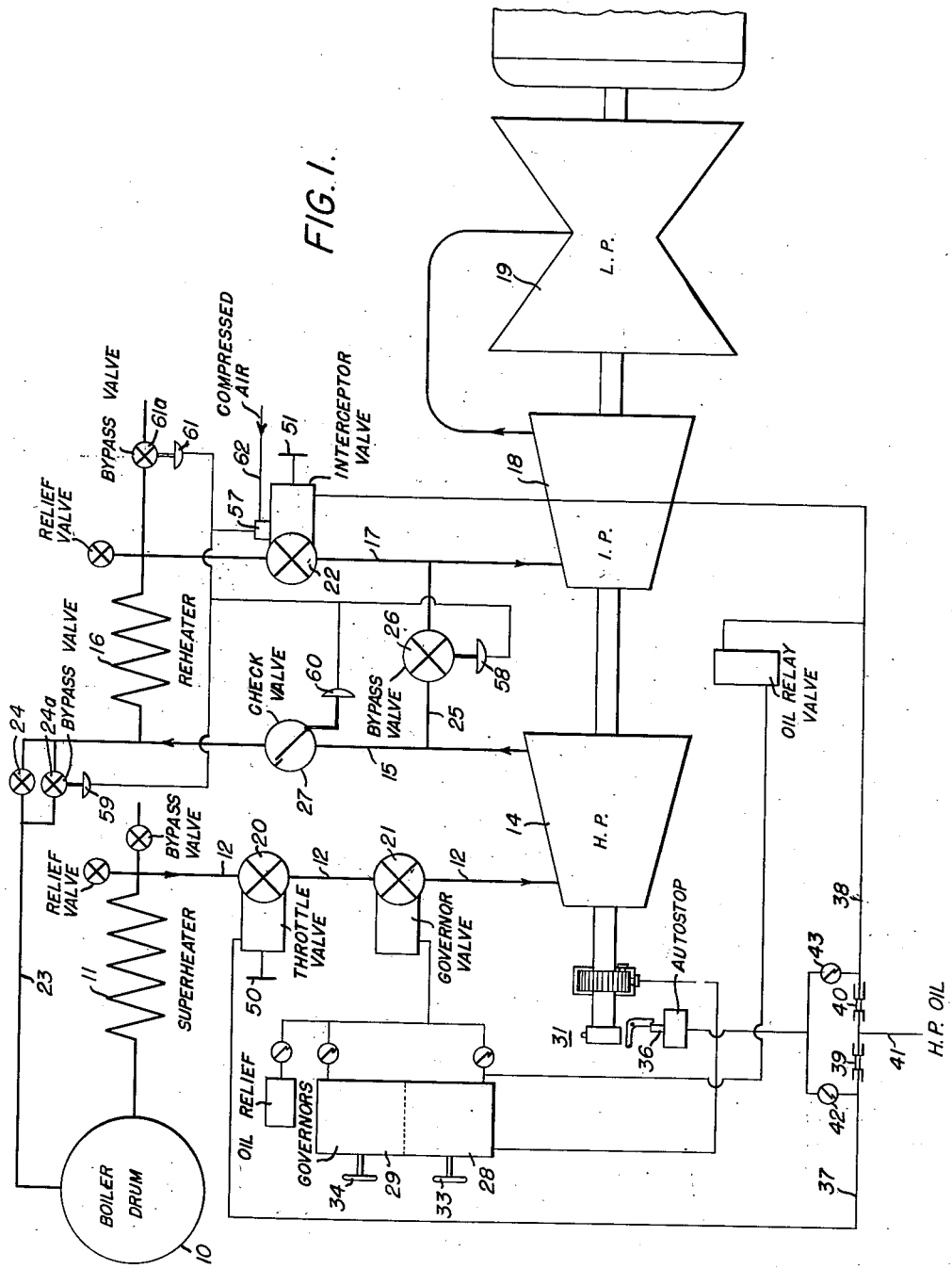

Feb. 19, 1952     O. N. BRYANT     2,586,510
REHEATER CONTROL FOR TURBINE APPARATUS
Filed Oct. 5, 1948     3 Sheets-Sheet 1

WITNESSES:
U. W. Novak
D. J. McCarty

INVENTOR
Ozro N. Bryant
BY
A. B. Ricons
ATTORNEY

Feb. 19, 1952     O. N. BRYANT     2,586,510
REHEATER CONTROL FOR TURBINE APPARATUS
Filed Oct. 5, 1948     3 Sheets-Sheet 2

INVENTOR
Ozro N. Bryant
BY
ATTORNEY

INVENTOR
Ozro N. Bryant
BY
ATTORNEY

Patented Feb. 19, 1952

2,586,510

UNITED STATES PATENT OFFICE 2,586,510

REHEATER CONTROL FOR TURBINE APPARATUS

Ozro N. Bryant, Prospect Park, Pa., assignor to Westinghouse Electric Corporation, East Pittsburgh, Pa., a corporation of Pennsylvania Application October 5, 1948, Serial No. 52,880

4 Claims. (Cl. 60—73)

1

The invention relates to a reheat turbine installation and it has for an object to control flow of steam to the turbine and through the reheater to guard against overspeeding of the turbine and to prevent overheating of the reheater.

A further object of the invention is to provide; with successive turbine sections, an intervening reheater and interceptor valve between the latter and the second turbine section, a passage by-passing the reheater and the interceptor valve, and a normally-closed valve in the passage; for flow of saturated steam to the reheater and for opening of the by-pass passage valve upon closing of the interceptor valve.

Since the interceptor valve is held open by autostop line pressure, it is closed whenever such pressure is insufficient. Therefore, during the warming-up and starting cycle and until opening of the interceptor valve, the connections are established to avoid overheating. Also, since increase in turbine speed, pursuant to sudden loss of load, brings about closing of the interceptor valve, the connections protecting against reheater overheating are thereby established. With sudden loss of load and consequent closing of the interceptor valve, the heat stored in the furnace is sufficient to overheat the reheater tubes unless adequate flow of steam is maintained for a sufficient time through such tubes. About 20% of full steam flow may be required for this purpose.

In the reheat turbine installation to which the present invention relates, superheated steam is supplied, through a throttle valve and a governor valve, to a high-pressure turbine section and steam exhausting from the latter is passed through a reheater and an interceptor valve to an intermediate turbine section. To assure of steam flow through the reheater adequate to avoid overheating, provision is made for supplying saturated steam thereto, when required, as when the interceptor valve closes pursuant to sudden load loss.

The present invention is concerned with throttle and governor valves in the supply connection for the high-pressure turbine section, an interceptor valve in the supply connection for the intermediate-pressure turbine section, a valve in the connection for supplying saturated steam to the reheater, and a reheater by-pass valve in the connection between the high-pressure and the intermediate-pressure turbine sections; with main, auxiliary and emergency governors cooperating with the throttle, admission and interceptor valves; and particularly with means responsive to closing of the interceptor valve to

2 open the reheater saturated steam supply valve and the reheater by-pass valve and to close the check valve in the high-pressure turbine section exhaust and reheater connection and to opening of the interceptor valve to produce a contrary operation, that is, to open the closed first-mentioned valves and to close the open second-mentioned valve.

The main governor controls the installation at the normal or rated speed of 3600 R. P. M. and has about 6 to 8% regulation to maximum flow. The auxiliary governor is set to take over control above 3600 R. P. M. and has about 1½ to 2% regulation. With the turbine carrying full load and operating at 3600 R. P. M., if there is sudden loss of load, the settled no-load speed will be about 3700 R. P. M., instead of 3800 or 3900 R. P. M. because the auxiliary governor automatically takes over control and closes the interceptor valve which in turn effects opening of the saturated steam supply to the reheater and opens the reheater by-pass line, and it then controls the governor valve at about 3700 R. P. M.

In addition to meeting the aforesaid overspeed conditions, the control arrangement should provide for warming up and acceleration to the point where the main governor takes over, whereupon the speed changer of the latter is operated, incident to synchronizing, followed by gradual opening of the admission valves to load the turbine. In shutting down the turbine, load is removed by speed changer adjustment and opening of the generator breakers followed by tripping of the autostop to bring about the following operations: closing of the throttle and the interceptor valves, opening of the saturated steam supply valve for the reheater, opening the reheater by-pass valve, and closing the check valve in the connection between the exhaust end of the high-pressure turbine section and the reheater to prevent flow of saturated steam through such connection and the by-pass to the intermediate-pressure turbine section. Sudden loss in load results in increase in speed, causing the auxiliary governor to close the governor valves and to trip closed the interceptor valve; and, just before the interceptor valve reaches closed position, a relay is operated to bring about opening of the valve in the saturated steam line to the reheater and of the reheater by-pass valve and closing of the check valve in the connection between the exhaust end of the high-pressure turbine section and the reheater, steam from the reheater then blowing off through the safety valve. As the speed falls to 3700 R. P. M., the auxiliary governor will open the governor valve set and hold the turbine speed. To restore the speed of the usual turbine-driven generator to synchronous relation with the system to which it is connected, following such operation pursuant to sudden load loss, the speed changer of the main governor is adjusted to lower the speed below 3700 R. P. M., whereupon the spring of the trip valve in the interceptor branch of the autostop pressure system overcomes the auxiliary governing pressure to close such valve in consequence of which the branch pressure is restored to reopen the interceptor valve, opening of the latter, due to its interlocked connection with the saturated steam valve, the by-pass valve and the check valve, operating to close the saturated steam and by-pass valves and to open the check valve.

Accordingly, a further object of the invention is to provide a turbine arrangement of the above character wherein the interceptor valve is interlocked in relation to the valve in the saturated steam line between the boiler drum and the reheater, the valve in the by-pass between the exhaust end of the high-pressure turbine section and the inlet of the intermediate-pressure turbine section, and the check valve in the connection between the exhaust end of the high-pressure turbine section and the reheater so that, during the final portion of closing travel of the interceptor valve, the saturated steam and by-pass valves are opened and the check valve is forcibly closed, and, during the initial portion of open travel of the interceptor valve from closed position, the contrary operation is produced, the saturated steam and by-pass valve closing and the check valve opening.

Figure 2A:
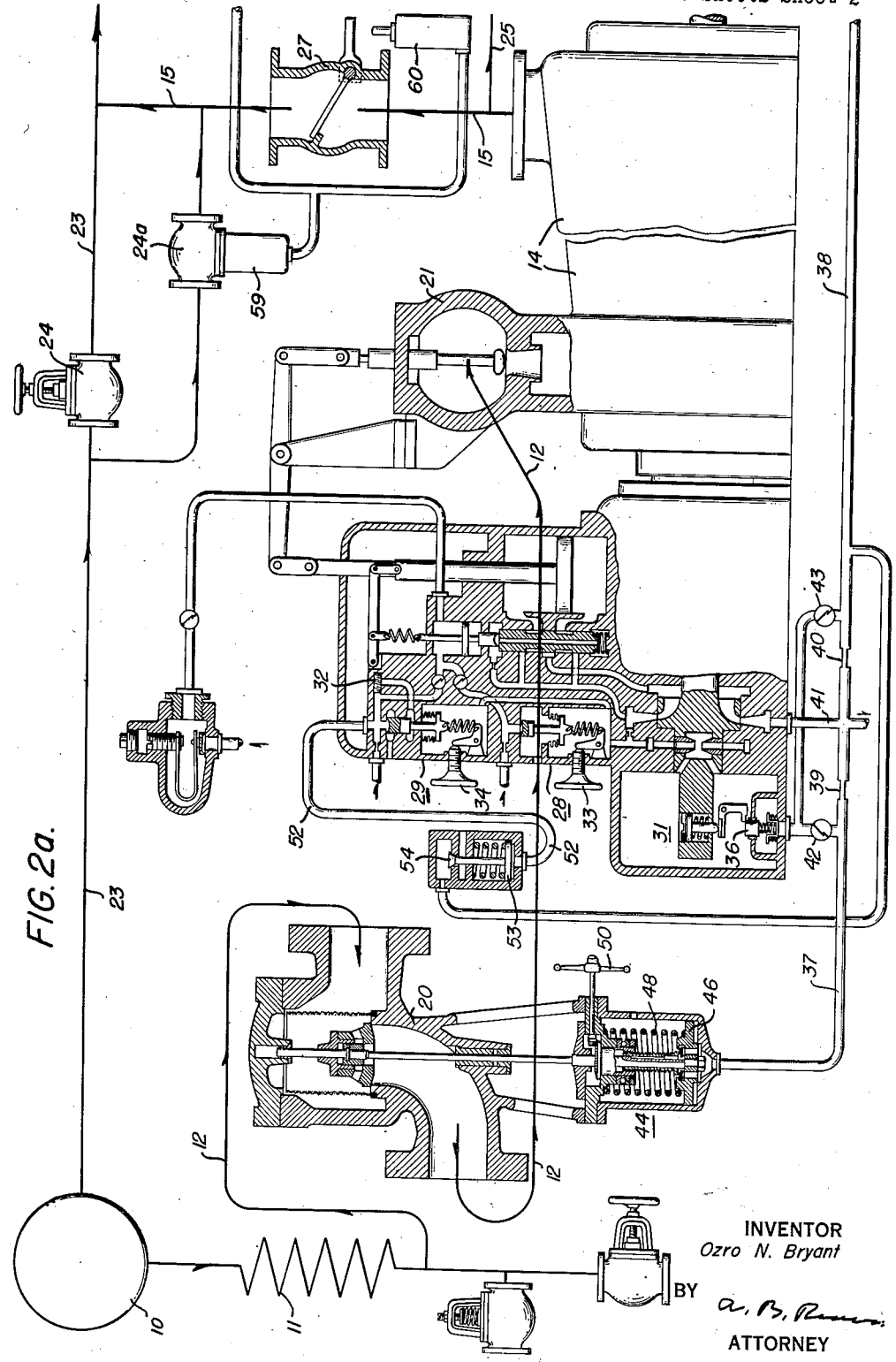
Figure 2B:
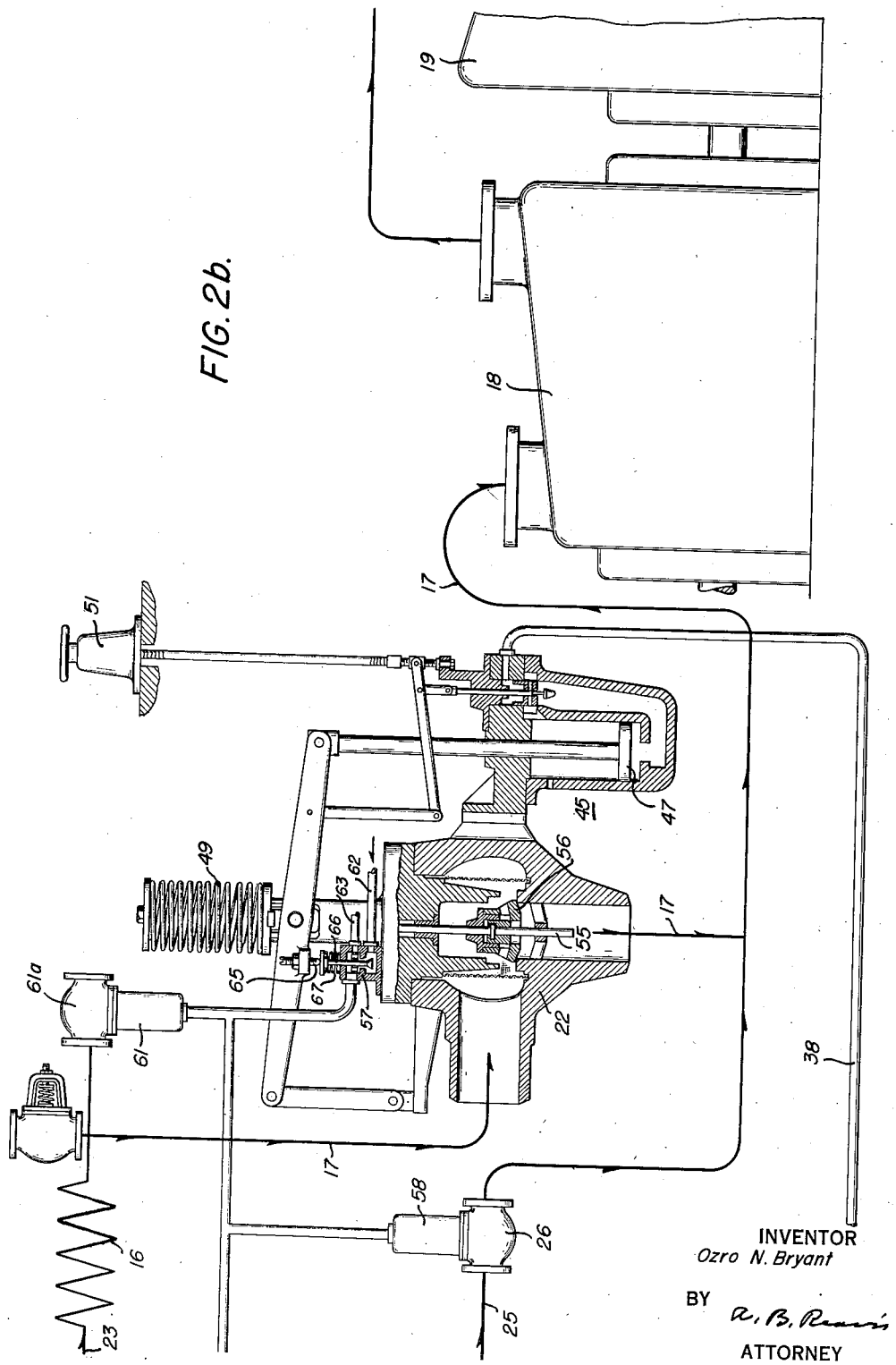

The foregoing and other objects are effected by the invention as will be apparent from the following description and claims taken in connection with the accompanying drawings, forming a part of this application, in which:

Fig. 1 is a diagrammatic view showing the application of the control system to a reheat turbine and boiler installation; and Figs. 2a and 2b taken together form a diagrammatic view showing control system component parts in section and elevation.

In the drawing, there is shown a reheat turbine plant in which saturated steam from the boiler drum 10 passes through the superheater 11 and the supply connection 12 to the high-pressure turbine section or element 14. Steam exhausting from the high-pressure turbine section passes through the connection 15 to the reheater 16, integrated with the boiler installation, and, from the reheater, steam passes through the supply connection 17 to the intermediate-pressure turbine section 18, steam exhausting from the latter being supplied to the low-pressure turbine 19.

The superheated steam supply connection 12 is provided with a throttle valve 20 and a governor valve set 21, and the connection 17 for supplying reheated steam to the intermediate turbine section includes an interceptor valve 22.

A connection 23 supplies saturated steam from the drum to the reheater when either or both of its valves 24 and 24a are open.

A connection 25 by-passes the reheater and it supplies steam exhausting from the high-pressure turbine section to the intermediate-pressure turbine section when its valve 26 is open. A check valve 27 in the connection 15 between the exhaust end of the high-pressure turbine section and the reheater provides for flow of high-pressure turbine section exhaust steam through the reheater to the intermediate-pressure section and it operates to block backflow through the reheater supply connection and the by-pass 25 to the intermediate turbine section.

The turbine is provided with main and auxiliary governors 28 and 29 and an emergency or autostop governor, at 31.

As more particularly disclosed and claimed in my application, Serial No. 36,837, filed July 3, 1948, now Patent No. 2,504,640, the main governor normally governs for a rated speed of 3600 r. p. m. with a regulation of from 6 to 8% for full flow, whereas the auxiliary governor has a much smaller regulation of the order of 1½ to 2%, secured, for example, by a compensator generally indicated by the numeral 32. The governors are provided with speed changers 33 and 34. The auxiliary governor speed changer is set so that it takes over control of the turbine whenever the rated speed is exceeded.

The emergency or autostop governor, at 31, operates, in response to a predetermined overspeed, to trip open the valve 36 normally holding liquid under pressure in the system including throttle and interceptor valve branches 37 and 38 supplied by means of orifices 39 and 40 from a high-pressure source 41. Check valves 42 and 43 provide for flow toward the autostop trip valve 36 so that, when the latter opens, the pressures in both branches drop. Pressures in the branches are applied to the throttle valve servo-motor, at 44, and the interceptor valve servo-motor, at 45, the respective servo-motors having pistons 46 and 47 connected to the throttle and interceptor valves to open and to hold open the latter against the forces of the springs 48 and 49, manually-operable devices 50 and 51 being provided to control application of fluid to the pistons and the extent of valve opening. The servo-motor, at 44, is of a conventional type wherein the spring is at all times effective to close the throttle valve upon release of oil pressure holding the valve open, and wherein the oil pressure is effective to open the throttle valve against the spring as determined by manual movement given to a pilot valve by the operating device 50. The servo-motor, at 45, because of the requirement for operation by the governor system, particularly by the auxiliary governor, in addition to operation by the spring, manual means and in response to tripping of the autostop is preferably of the type more particularly disclosed and claimed in the application of Meyer, Serial No. 60,278, filed Nov. 16, 1948. It will be apparent, therefore, that, if the valve 36 is tripped open by the emergency governor, the pressures drop in both branches 37 and 38 and the springs close the throttle and interceptor valves.

Pressure in the interceptor valve branch line 38 is also subject to relief in response to the auxiliary governor when the latter takes over control of the turbine, the auxiliary governing pressure being furnished by the conduit 52 for action on the piston 53 to trip open the valve 54 to relieve the pressure in the interceptor branch line when the turbine reaches a speed of about 3700 R. P. M.

As is common practice with throttle valves, the interceptor valve stem 55 has a small amount of lost motion relative to the plug portion 56, this lost motion being used to reduce the differential pressure existing across the plug portion with the valve in closed position to make it easier to open the valve. The lost motion of stem travel, usually the last ¼ inch, is used to operate an air valve 57 for connecting pressure-responsive devices 58, 59, 60 and 61 with a pressure source 62 or with the exhaust 63.

The air valve 57 is operated by the final portion of closing travel of the interceptor valve stem to supply pressure to the pressure-responsive devices 58 and 59 to open the by-pass between the high-pressure and the intermediate-pressure turbine sections and the saturated steam line connecting the boiler drum and the reheater and to the pressure-responsive device 60 to close positively the check valve in the connection between the exhaust end of the high-pressure turbine section and the reheater, and it is operated by the initial portion of opening travel of the stem to relieve air pressure applied to the pressure-responsive devices for the contrary operation, the operation or bias effect of the pressure-responsive devices then closing the by-pass and saturated steam valves and opening the check valve. Also, the reheater is preferably provided with a valve 61a, in addition to a relief valve, to provide for discharge of steam from the reheater to the atmosphere when the interceptor valve is closed, the valve 61a being operated by an air-pressure-responsive device 61, similarly to the valves 24a and 26.

Any suitable means may be used for operating the valve 57 by the interceptor valve stem. For example, an adjustable abutment 65 is carried by any suitable element of the stem system and it is arranged to depress the stem 66 against the force of the spring 67 to open the air valve 57 for application of air under pressure to the pressure-responsive devices. As the abutment moves out of the way, the spring 67 moves the valve 57 to restore communication of the pressure-responsive devices with the exhaust.

It will, therefore, be apparent that the turbine is protected against overspeeding and that the reheater is protected against overheating. If the turbine overspeeds to a predetermined extent, the emergency governor operates to trip the pressure in the autostop system and close the throttle and interceptor valves; however, to restore the machine to the line, it is necessary to reset the autostop valve for restoration of pressure, to reopen the throttle valve and the interceptor valve to bring the turbine to 3600 R. P. M. for governor control, whereupon, by speed changer operation, the generator driven by the turbine may be synchronized with the system to which it is connected and loaded to the desired extent.

In case of load loss or dump, consequent increase in turbine speed renders the auxiliary governor effective to close the governor valve and to reduce the pressure on the piston 47 which holds the interceptor valve open, without having any influence on the pressure acting on piston 46 for holding the throttle valve open, closing motion of the interceptor valve causing the air system to open the saturated steam and by-pass valves to avoid over-heating of the reheater. With increase in speed of the turbine checked the auxiliary governor will then control the governor valve set to hold the speed at 3700 R. P. M. To restore the synchronous relation of the generator driven by the turbine, the speed changer of the main governor is adjusted to lower the speed; and, just as soon as the speed falls below 3700 R. P. M., the decreasing auxiliary oil pressure is overcome by the spring to close the trip valve, whereupon, pressure in the interceptor valve branch of the emergency or autostop pressure system is restored to open the interceptor valve, opening of the latter causing closing of the saturated steam and by-pass valves and opening of the check valve. Thereupon, by speed changer adjustment, the speed of the generator driven by the turbine is synchronized with the system while the turbine is operated to carry the desired load.

While I have shown my invention in but one form, it will be obvious to those skilled in the art that it is not so limited, but is susceptible of various changes and modifications without departing from the spirit thereof.

What I claim is:

1. In a boiler and turbine installation wherein steam normally passes from a saturated steam drum through a superheater and a connection to the inlet of a high-pressure turbine section and steam exhausting from the latter passes through a reheater to the inlet of an intermediate turbine section and wherein there is provided a connection for supplying saturated steam from the drum to the reheater and a reheater by-pass connecting the exhaust end of the high-pressure turbine section and the inlet of the intermediate-pressure turbine section, the combination of, a throttle valve and a governing valve set in the connection for supplying superheated steam to the high-pressure turbine section, an interceptor valve in the connection for supplying reheated steam to the intermediate-pressure turbine section, a valve in the reheater saturated steam supply connection, a valve in said by-pass, means for closing the interceptor valve in response to turbine overspeed and means responsive to the terminal portion of closing movement of the interceptor valve to open the saturated steam and by-pass valves and to the initial portion of opening movement of the interceptor valve to close the open saturated steam and by-pass valves.

2. In a boiler and turbine installation wherein steam normally passes from a saturated steam drum through a superheater and a connection to the inlet of a high-pressure turbine section and steam exhausting from the latter through a connection passes through a reheater and a connection to the inlet of an intermediate-pressure turbine section and wherein there is provided a connection for supplying saturated steam from the drum to the reheater and a reheater by-pass connecting the exhaust end of the high-pressure turbine section and the inlet of the intermediate-pressure turbine section, the combination of, a throttle valve and a governing valve set in the connection for supplying superheated steam to the high-pressure turbine section, an interceptor valve in the connection for supplying reheated steam to the intermediate-pressure turbine section, a valve in the reheater saturated steam connection, a valve in said by-pass, a check valve in the connection between the exhaust end of the high-pressure turbine section and the reheater, means for closing the interceptor valve in response to turbine overspeed, and means responsive to the terminal portion of closing movement of the interceptor valve to open the saturated steam and by-pass valves and to close the check valve and to the initial portion of opening movement of the interceptor valve to close the open saturated steam and by-pass valves and to open the closed check valve.

3. In a boiler and turbine installation wherein steam normally passes from a saturated steam drum through a superheater and a connection to the inlet of a high-pressure turbine section and steam exhausting from the latter through a connection passes through a reheater and a connection to the inlet of an intermediate-pressure turbine section and wherein there is provided a connection for supplying saturated steam from the drum to the reheater and a reheater by-pass connecting the exhaust end of the high-pressure turbine section and the inlet of the intermediate-pressure turbine section, the combination of, a throttle valve and a governing valve set in the connection for supplying superheated steam to the high-pressure turbine section; an interceptor valve in the connection for supplying reheated steam to the intermediate-pressure turbine section; a valve in the reheater saturated steam connection; a valve in said by-pass; a check valve in the connection between the exhaust end of the high-pressure turbine section and the reheater; pressure-responsive devices operative to open and close the saturated steam valve, the by-pass valve and the check valve; and a valve operated by the final portion of closing movement and the initial portion of opening movement of the interceptor valve to control the application of air under pressure to and the exhaust of air from said pressure-responsive devices so that, during the final portion of closing movement of the interceptor valve, the saturated steam and by-pass valves are opened and the check valve is closed, and, during the initial portion of opening movement of the interceptor valve from closed position, the saturated steam and by-pass valves are closed and the check valve is opened.

4. The combination as claimed in claim 3 with a discharge valve for the reheater and means for operating the discharge valve in response to said controlled air pressure such that the discharge valve is opened during the final portion of closing movement of the interceptor valve and is closed during the initial portion of opening movement of such valve.

OZRO N. BRYANT.

REFERENCES CITED

The following references are of record in the file of this patent:

FOREIGN PATENTS

| Number | Country | Date |
|--------|---------|------|
| 188,877 | Great Britain | Nov. 23, 1922 |